United States Patent
Auclair et al.

(10) Patent No.: US 8,068,972 B2
(45) Date of Patent: Nov. 29, 2011

(54) ABNORMAL COMBUSTION DETECTION METHOD FOR INTERNAL-COMBUSTION ENGINES

(75) Inventors: Dominique Auclair, Villiers-sur-Marne (FR); Laurent Duval, Nanterre (FR); Alexandre Pagot, Rueil-Malmaison (FR); Benoist Thirouard, Rueil-Malmaison (FR); Jean-Marc Zaccardi, Seynod (FR)

(73) Assignee: IFP, Cedex (FR)

( * ) Notice: Subject to any disclaimer, the term of this patent is extended or adjusted under 35 U.S.C. 154(b) by 138 days.

(21) Appl. No.: 12/567,934

(22) Filed: Sep. 28, 2009

(65) Prior Publication Data
US 2010/0094528 A1    Apr. 15, 2010

(30) Foreign Application Priority Data

Oct. 9, 2008 (FR) .................................. 08 05580

(51) Int. Cl.
*F02D 41/22* (2006.01)
(52) U.S. Cl. ... 701/107; 701/111; 123/435; 123/406.13; 123/479
(58) Field of Classification Search .................. 701/111, 701/106, 107, 113; 123/435, 406.13, 406.27, 123/406.37, 479, 480; 73/35.3, 35.6, 35.7, 73/35.12, 114.02
See application file for complete search history.

(56) References Cited

U.S. PATENT DOCUMENTS

| | | | |
|---|---|---|---|
| 7,387,107 B2 * | 6/2008 | Kaneko et al. | 123/406.21 |
| 7,461,633 B2 * | 12/2008 | Vangraefschepe et al. | 123/434 |
| 7,669,582 B2 * | 3/2010 | Kaneko et al. | 123/406.21 |
| 2007/0016387 A1 | 1/2007 | Takemura et al. | |
| 2008/0035129 A1 | 2/2008 | Vangraefschepe | |

FOREIGN PATENT DOCUMENTS

| | | |
|---|---|---|
| DE | 10 2004 033 072 A1 | 7/2005 |
| EP | 1 828 737 | 6/2006 |
| FR | 2 897 900 | 8/2007 |
| WO | WO 2007/001064 A1 | 1/2007 |

* cited by examiner

*Primary Examiner* — Hai Huynh
(74) *Attorney, Agent, or Firm* — Antonelli, Terry, Stout & Kraus, LLP.

(57) ABSTRACT

The invention is an abnormal combustion detection method for spark-ignition internal-combustion engines. For each engine cycle, a parameter characterizing a distribution of N combustion indicator values, CA10 for example, acquired over N cycles preceding the cycle in progress, is determined while ignoring extreme values. A threshold is defined from this parameter for the combustion indicator. The start of an abnormal combustion is then detected by comparing the combustion indicator with this threshold and the course of the abnormal combustion detected in the combustion chamber is controlled.

30 Claims, 5 Drawing Sheets

ABNORMAL COMBUSTION DETECTION METHOD FOR INTERNAL-COMBUSTION ENGINES

BACKGROUND OF THE INVENTION

1. Field of the Invention

The present invention concerns the sphere of combustion stage control of internal-combustion engines. The present invention notably relates to a method for detecting an abnormal combustion, of pre-ignition at low speed and high load type, in a combustion chamber of such engines.

It more particularly relates, but not exclusively, to such a method applied to a downsized spark-ignition engine running at very high loads.

2. Description of the Prior Art

This aforementioned type of engine includes at least one cylinder comprising a combustion chamber defined by the inner lateral wall of the cylinder, by the top of the piston that slides in this cylinder and by the cylinder head. Generally, a fuel mixture is contained in this combustion chamber which undergoes compression stage and then a combustion stage under the effect of a spark ignition, by means of a spark plug. These stages are grouped together under the term "combustion stage" in the description hereafter.

It has been observed that this fuel mixture can undergo various combustion types and that these combustion types are the source of different pressure levels, and of mechanical and/or thermal stresses some of which can seriously damage the engine.

The first combustion, referred to as conventional combustion or normal combustion, is the result of the propagation of the combustion of a fuel mixture compressed during a prior engine compression stage. This combustion normally propagates in a flame front from the spark generated at the plug and there is no risk it may damage the engine.

Another combustion type is a knocking combustion resulting from an unwanted self-ignition in the combustion chamber. Thus, after the fuel mixture compression stage, the plug is actuated so as to allow ignition of this fuel mixture. Under the effect of the pressure generated by the piston and of the heat released by the fuel mixture combustion start, a sudden and localized self-ignition of part of the compressed fuel mixture occurs before the flame front resulting from the ignition of the fuel mixture by the spark plug comes near. This mechanism, referred to as engine knock, leads to a local pressure and temperature increase and it can generate, in case it occurs repeatedly, destructive effects on the engine and mainly on the piston.

Finally, another combustion type is an abnormal combustion due to a pre-ignition of the fuel mixture before the spark plug initiates ignition of the fuel mixture present in the combustion chamber.

This abnormal combustion affects engines that are the result of a downsizing operation. This operation is intended to reduce the size and/or the capacity of the engine while keeping the same power and/or the same torque as conventional engines. Generally, this type of engine is essentially of gasoline type and it is highly supercharged.

It has been observed that this abnormal combustion occurs at high loads and generally at low engine speeds, when timing of the fuel mixture combustion cannot be optimum because of engine knock. Considering the high pressures and the high temperatures reached in the combustion chamber as a result of supercharging, an abnormal combustion start can occur sporadically or continuously well before ignition of the fuel mixture by the spark plug. This combustion is characterized by a first flame propagation phase that occurs too soon in relation to that of a conventional combustion. This propagation phase can be interrupted by a self-ignition involving a large part of the fuel mixture present in the combustion chamber, much larger than in the case of engine knock.

If this abnormal combustion takes place repeatedly from engine cycle to engine cycle and starts from a hot spot of the cylinder for example, it is referred to as "pre-ignition". If this combustion occurs suddenly, in a random and sporadic way, it is referred to as "rumble".

The latter abnormal combustion leads to very high pressure levels (120 to 250 bars) and to a thermal transfer increase that may cause partial or total destruction of the moving elements of the engine, such as the piston or the piston rod.

Figure 1:
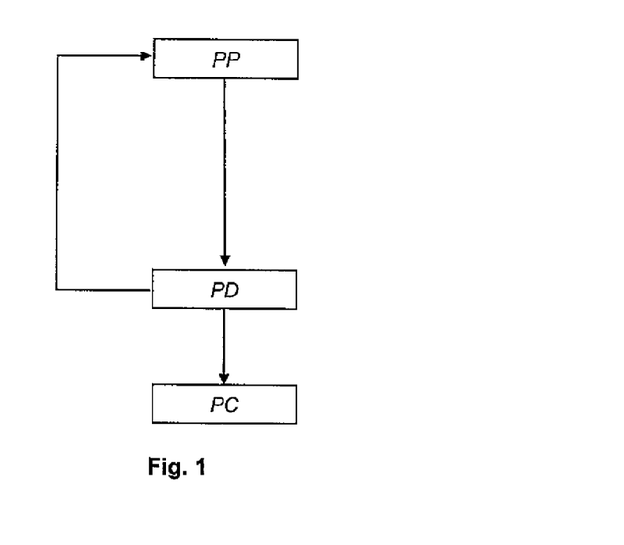
FIG. 1 shows the general methodology for dealing with abnormal combustions of pre-ignition type.

The general methodology for dealing with these abnormal combustion is diagrammatically shown in FIG. 1, with first a prevention phase (PP) for limiting to the maximum phenomenon appearance risks, then a detection phase (PD) when prevention is not sufficient to avoid the phenomenon, to determine whether it is pertinent to intervene in the very cycle where pre-ignition was detected by means of a corrective phase (PC).

The detection phase comprises a signal acquisition stage, then a signal processing stage allowing detection of the appearance of pre-ignition at high load, to characterize and to quantify it.

Patent application EP-1,828,737 describes a method for detecting the appearance of pre-ignition at high load, of the rumble type. This method is based on the measurement of a signal relative to the progress of the combustion and a comparison with a threshold signal. The presence of an abnormal combustion of the rumble type in the combustion chamber is detected when the amplitude of the signal significantly exceeds that of the threshold signal. According to this method, the threshold signal corresponds to the amplitude of the signal produced upon knocking combustion or normal (conventional) combustion.

However, according to this method, the detection thus achieved does not allow acting during the cycle of the detection. The corrective actions on this type of pre-ignition can only be carried out after such a phenomenon has occurred, which may seriously harm the engine integrity.

Another method is also described in French Patent 2,897,900. According to this method, action can be taken more rapidly after pre-ignition detection with action during the same cycle as the phenomenon detection cycle. The threshold signal is therefore first calculated, that is before engine operation, then stored in data charts of the calculator referred to as maps.

However, the use of engine maps does not allow detection of any time, that is in real time, the start of such a phenomenon. In fact, detection may occur too late. Furthermore, no quantification of the evolution of the phenomenon can be carried out. Thus, the necessity or not of applying a corrective phase is based only on the comparison of two amplitudes at a given time. Now, such a phenomenon may also start, then stop without causing any damage to the engine, and therefore require no corrective phase.

SUMMARY OF THE INVENTION

The invention thus is an alternative method allowing detection in real time of a pre-ignition phenomenon at high load (of the rumble type), to characterize and to quantify it, with the devices and systems commonly used in engines, to take steps allowing prevention in the next engine operating phases, during the same cycle as the detection cycle. The method is based on a characterization of combustion indicator values, CA10 for example, over several cycles, while ignoring cycles for which pre-ignition occurs.

The invention thus is a method for controlling the combustion of a spark-ignition internal-combustion engine, wherein an abnormal combustion is detected in a combustion chamber of at least one cylinder of the engine, a signal representative of a state of the combustion is recorded by a detector in the engine and at least one indicator of the combustion at each engine cycle is determined from the signal. The method comprises the following stages for each engine cycle:

determining at least one parameter characterizing a distribution of N combustion indicator values acquired over N cycles preceding the cycle in progress, while ignoring, among the N values, the extreme or deviant values;

defining at least one threshold for the indicator by the parameters characterizing the distribution;

detecting the start of an abnormal combustion by comparing the combustion indicator with the threshold; and controlling the abnormal combustion detected in the combustion chamber.

According to an embodiment, the signal can be a continuous pressure measurement within the cylinder. The indicator can be the crank angle where a percentage of the energy, such as 10%, is introduced has been released.

According to an embodiment, the parameter characterizing the distribution is determined by a robust estimator. This robust estimator can be selected from among one of the following robust estimators: trimmed mean, median, and an estimator m resulting from a minimization of the following function f:

$$f(V,m) = (|V(1)-m|)^a + \ldots + (|V(N)-m|)^a,$$

where a is a real number ranging between 0 and 2, and V(1) ... V(n) are the N combustion indicator values.

According to another embodiment, the parameter characterizing the distribution is determined from a distribution modelling, by applying the following stages:

a) removing X indicator values from the N values of the distribution to be modelled;
b) modelling the distribution of the remaining indicator values by selecting an a priori experimental distribution law;
c) calculating a modelling quality criterion; and
d) if the criterion indicates an insufficient modelling quality, removing other indicator values from the remaining N-X values and repeating b).

According to this embodiment, the modelling quality criterion can correspond to a sum of rms deviations between the a priori experimental distribution and the modelled distribution, or to a sum of absolute deviations between the a priori experimental distribution and the modelled distribution.

According to the invention, the threshold can be determined by defining a tolerance for the parameter characterizing the distribution. For example, the threshold can correspond to a sum of the trimmed mean of the N indicator values and of k times the standard deviation of the N values with k being a positive or negative real number.

The threshold can also be determined by constraints defined from threshold values obtained on the test bench, and/or from threshold values obtained in previous cycles.

Finally, according to the invention, several combustion indicators can be determined and at least one threshold is determined for each one of them.

BRIEF DESCRIPTION OF THE DRAWINGS

Other features and advantages of the invention will be clear from reading the description hereafter, with reference to the accompanying figures wherein:

FIGS. 5A and 5B show a distribution of CA10 values as a function of the cycle. In FIG. 5A, the mean and the standard deviation are calculated from conventional statistics, and in FIG. 5B the mean and the standard deviation are obtained from robust statistics.

DETAILED DESCRIPTION OF THE DRAWINGS

Figure 2:
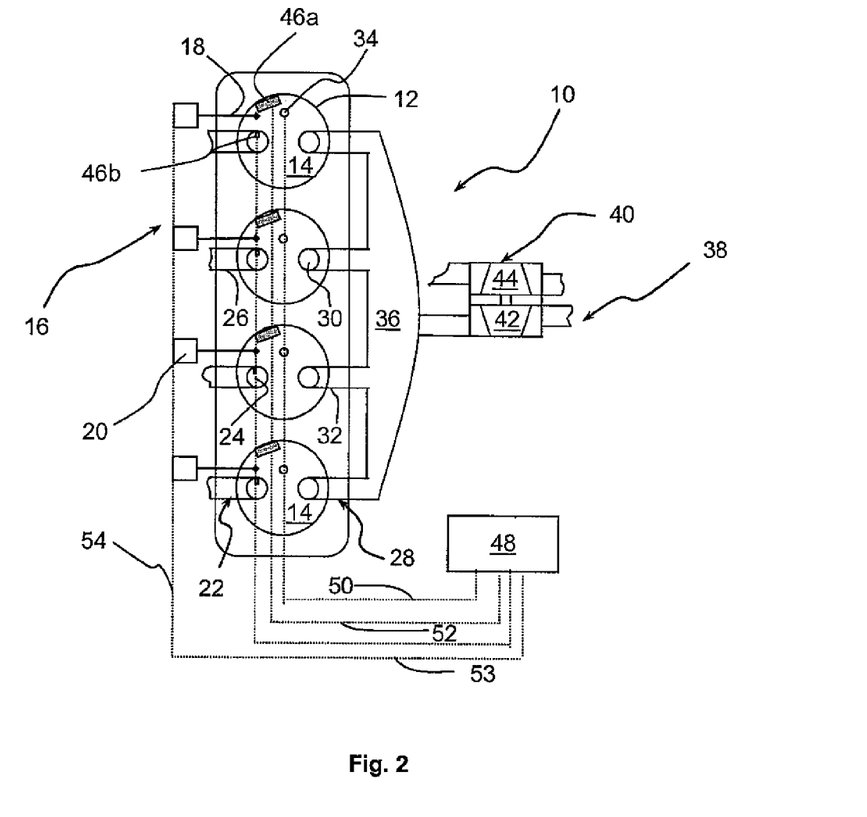
FIG. 2 shows an engine using the detection method according to the invention.

In FIG. 2, a spark-ignition supercharged internal-combustion engine 10, in particular of gasoline type, comprising at least one cylinder 12 with a combustion chamber 14 within which combustion of a mixture of supercharged air and of fuel takes place.

The cylinder comprises at least one means 16 for delivering fuel under pressure, for example in form of a fuel injection nozzle 18 controlled by a valve 20 and opening into the combustion chamber, at least one air supply means 22 with a valve 24 associated with an intake pipe 26 ended by a plenum 26b (not shown in the figure), at least one burnt gas exhaust means 28 with a valve 30 and an exhaust pipe 32, and at least one ignition means 34 such as a spark plug that allows generation of one or more sparks allowing the fuel mixture present in the combustion chamber to be ignited.

Pipes 32 of exhaust means 28 of this engine are connected to an exhaust manifold 36 itself connected to an exhaust line 38. A supercharging device 40, a turbocompressor or a positive-displacement compressor for example, is disposed in the exhaust line and comprises a drive stage 42 with a turbine scavenged by the exhaust gas circulating in the exhaust line, as well as a compression stage 44 allowing an intake of air under pressure to be fed into combustion chambers 14 through intake pipes 26.

The engine comprises means 46a for measuring the cylinder pressure, disposed within cylinder 12 of the engine. These measuring means generally are a pressure detector allowing generation of a signal representative of the evolution of the pressure in a cylinder.

The engine can also comprise means 46b for measuring the intake pressure disposed in plenum 26b. These measuring means generally are an absolute pressure detector, of piezoelectric type, allowing generation of a signal representative of the evolution of the intake pressure in the intake plenum.

The engine also comprises a computing and control unit 48 referred to as engine calculator, which is connected by conductors (bidirectional for some of them) to the various elements and detectors of the engine so as to be able to receive the various signals emitted by these detectors, such as the temperature of the water or the temperature of the oil, in order to process them and then to control the components of this engine so as to ensure smooth running thereof.

Thus, in the case of the example shown in FIG. 2, spark plugs 34 are connected by conductors 50 to engine calculator 48 so as to control the ignition time of the fuel mixture, cylinder pressure detector 46a is connected by a line 52 to the engine calculator so as to send thereto signals representative of the evolution of the pressure in the cylinder, and valves 20 controlling injection nozzles 18 are connected by conductors 54 to calculator 48 to control fuel injection in the combustion chambers. Means 46b are also connected by a line 53 to engine calculator 48.

In such an engine, the method according to the invention allows detection of the appearance of a pre-ignition phenomenon at high load (rumble type), to characterize and to quantify it. According to an embodiment example, the method comprises the following stages:

1—measuring the pressure in the cylinder and determining therefrom a combustion indicator in each engine cycle, then, for each cycle:
2—determining parameters characterizing the distribution of N indicator values acquired over the N cycles preceding the cycle in progress, while ignoring some values referred to as extreme values;
3—defining a threshold characterizing a combustion without pre-ignition by means of the parameters characterizing the distribution;
4—detecting the start of an abnormal combustion by comparing the combustion indicator calculated during the cycle in progress with the threshold;
5—controlling the course of the abnormal combustion detected in the combustion chamber.

1—Determining a Combustion Indicator in Each Cycle

A signal representative of the state of the combustion is recorded by a detector arranged in the engine. According to an embodiment, the cylinder pressure is selected. Measurement of the cylinder pressure is achieved from cylinder pressure measuring means 46a. Instrumentation of the cylinders for pressure measurement has become increasingly common in vehicles.

Then, during each cycle, a combustion indicator is calculated from this signal. According to an embodiment, indicator CA10 is selected. CA10 corresponds to the crank angle where 10% of the energy introduced has been released or, according to the convention used, 10% of the total energy released.

2—Normal Combustion Characterization from the Indicators

Characterization of a normal combustion, that is without pre-ignition phenomenon, is carried out online from N CA10 values calculated in the preceding N-1 cycles and the cycle in progress.

Figure 3:
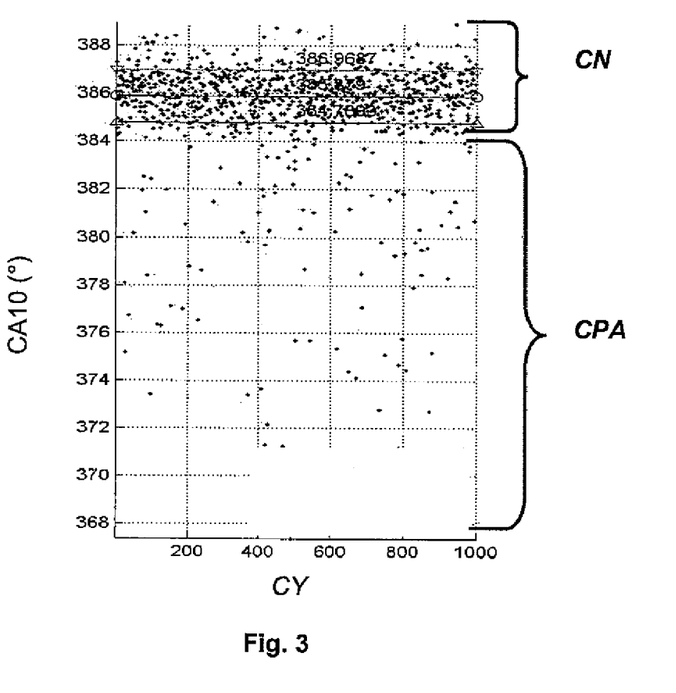
FIG. 3 illustrates a distribution of CA10 values as a function of the cycle (CY), by identifying normal combustions (CN) and combustions with pre-ignition (CPA)
Figure 4:
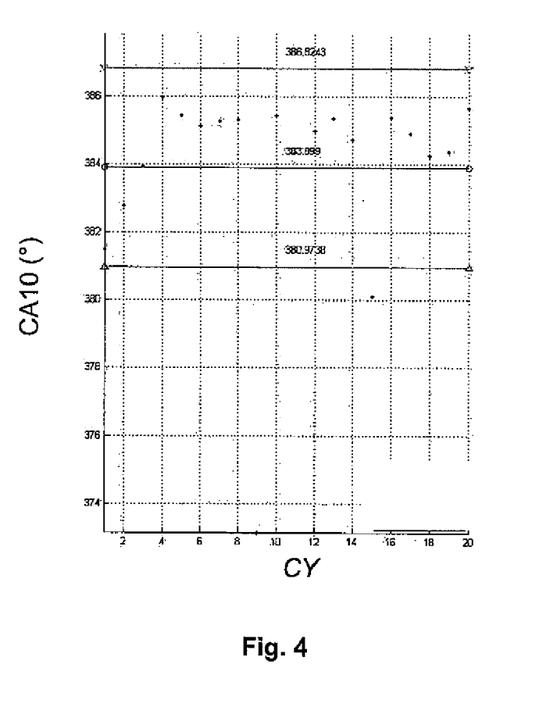
FIG. 4 illustrates a distribution of CA10 values as a function of the cycle (CY), by identifying normal combustions (CN) and combustions with pre-ignition (CPA) in cases where few CA10 values are available.

Two problems have to be overcome to achieve this characterization:

1—Some CA10 values were obtained in cycles wherein a pre-ignition occurred. These values are therefore not characteristic of a normal combustion. These CA10 values obtained during cycles wherein pre-ignition occurred are referred to as outliers or extreme values. These values deviate excessively from all the other observations of the data group they belong to. FIG. 3 illustrates this distribution of the CA10 values as a function of the cycle (CY). The dense upper cluster corresponds to normal combustions (CN) whereas the lower cluster corresponds to combustions with pre-ignition (CPA);

2—the necessity of rapidly controlling the combustion involves a limited number of cycles (low value of N, typically of the order of ten), and therefore few CA10 values for characterizing a normal combustion. The CA10 values obtained during cycles wherein pre-ignition occurs are therefore all the more influential and they do not allow obtaining sufficient characterization to later detect pre-ignition. FIG. 4 illustrates this problem. It shows a distribution of some CA10 values as a function of the cycle.

According to the invention, a normal combustion, i.e. without pre-ignition phenomena, is characterized by determining one or more parameters characteristic of the distribution of the N values of CA10 calculated over the N-1 preceding cycles and the cycle in progress while ignoring the values referred to as extreme.

According to an embodiment, these parameters are determined by a robust estimator. A robust estimator differs from a non-robust estimator in that it is not greatly affected by the presence, in the measurements acquired, of a certain amount of extreme values. Such estimators are for example described in the document as follows:

G., SAPORTA, 1990 "Probabilité Analyse des Données et Statistiques", Editions Technip, pp. 311-313.

One of the following estimators can for example be selected:

the trimmed mean: the mean is calculated on measurements from which x % of the highest scores and x % of the lowest scores have been discarded,
the median: the measurements are classified from the lowest to the highest score, and the median is the value above which lies half the measurements and below which lies the other half of the measurements,
a specific class of robust estimators is obtained by minimizing a particular cost function defined from the measurements. The median is for example the estimator of this type that minimizes the sum of the absolute deviations from the measurements. Other functions can however be used.

In general terms, to calculate these robust estimators, one minimizes a function f that is defined from the N values of CA10, denoted by V(1) ... V(N), and the estimator sought. Minimization of this function leads to the value of the robust estimator. The robust estimator m that minimizes the following function f can for example be calculated:

$$f(V,m) = (|V(1)-m|)^a + \ldots + (|V(N)-m|)^a,$$

where a is a real number ranging between 0 and 2.

These parameters (robust estimators) are insensitive to extreme values. According to this embodiment, an abnormal combustion can be detected either on a stabilized working point or during transient operation.

Figure 5A:
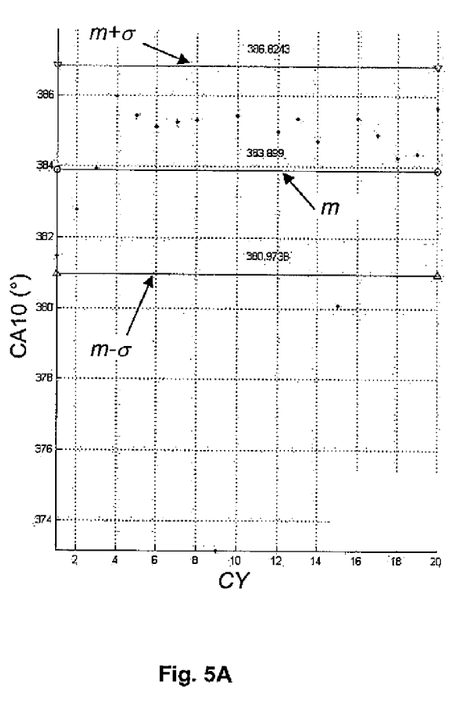
Figure 5B:
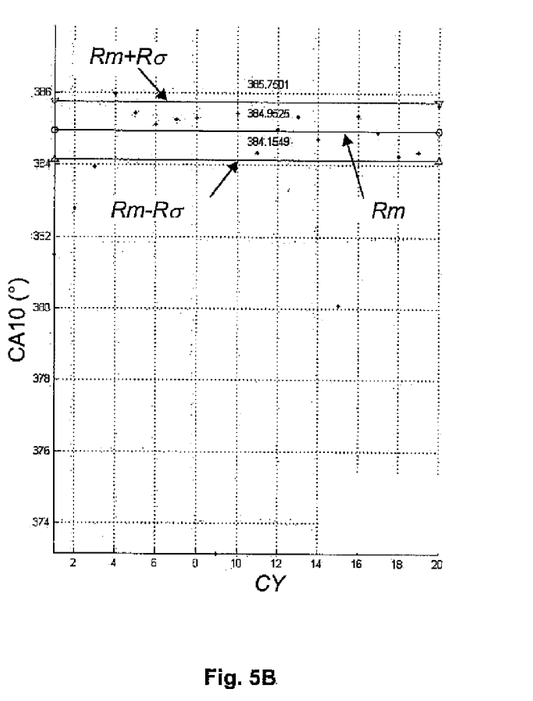

FIG. 5 illustrates the result of this method. FIGS. 5A and 5B show a distribution of CA10 values as a function of the cycle. Line m represents the mean and σ the standard deviation. In FIG. 5A, the mean and the standard deviation are calculated from conventional statistics. In FIG. 5B, the mean and the standard deviation are obtained from robust statistics denoted by Rm and Rσ.

According to another embodiment, these parameters are determined by modelling the distributions of the N values of CA10 using an iterative process.

Figure 6:
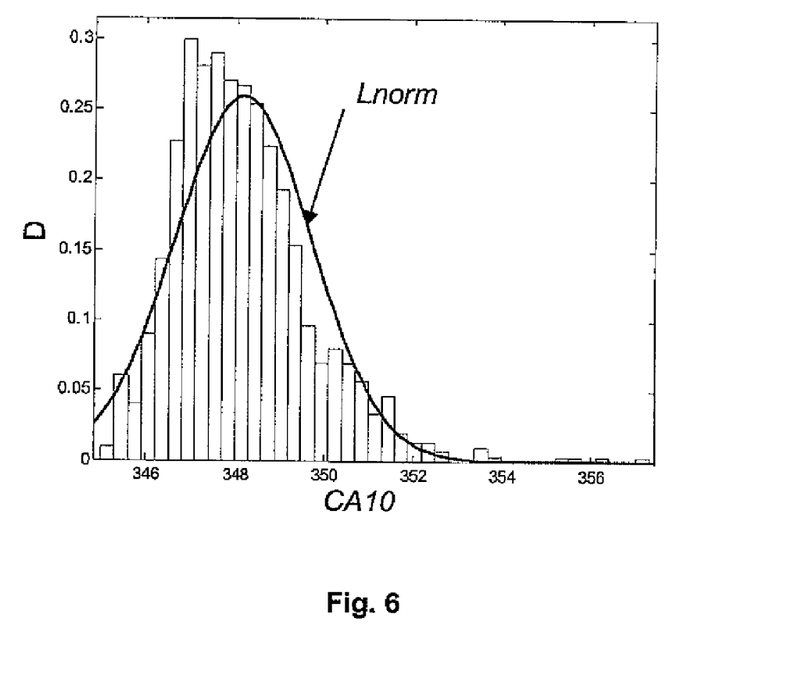
FIG. 6 shows a histogram of CA10 values and a normal law allowing to best adjust to this histogram.

The cycle to cycle dispersion of the combustion is generally represented by a normal law with which a mean serving as a reference for characterizing the behaviour of the engine and a standard deviation conventionally being used to quantify the observed stability of the quantity are associated. Now, it appears that the conventional standard deviation is not always representative of the stability and that modelling of the cyclic dispersion by a normal law is not optimum under certain conditions, as illustrated by FIG. 6. This figure shows the histogram of values of CA10 (the ordinate shows density D) and a normal law (Lnorm) allowing to best adjust to this histogram. This combustion instability can be directly felt by the user for example through ignition misfires (driveability problem, emissions) and it can also be linked, in some extreme cases, with abnormal combustions that may lead to engine destruction (pre-ignition at high load in spark-ignition engines).

The distribution modelling method according to the invention allows providing more pertinent information than a "mean/standard deviation" pair calculated in the sense of the normal law. This is important for detecting an abnormal combustion such as pre-ignition.

Figure 7:
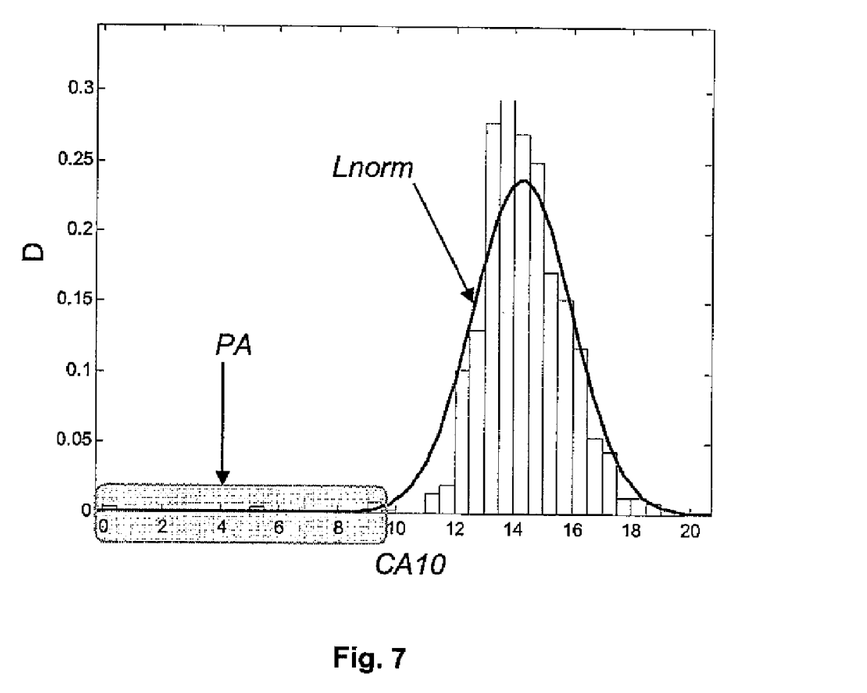
FIG. 7 shows a histogram of CA10 values and a normal law allowing to best adjust to this histogram in the case of pre-ignition appearance (PA)

FIG. 7 gives an example of experimental distribution of CA10 and of modelling by a normal law (Lnorm) in the case of an appearance of a pre-ignition (PA). It can be observed that the cycles with pre-ignition influence the distribution towards the lower CA10 values. Consequently, the modelling performed (whether based on a normal law or another) is inevitably distorted by this influence because it does not in any way represent a normal combustion.

Modelling the normal combustions alone (that is combustions initiated by the spark of the plug) cannot be done from the complete sample of N cycles. Therefore an automatic method is providing leading to optimum modelling of normal combustions. This procedure iterates over the number of samples to find the optimum modelling.

Figure 8:
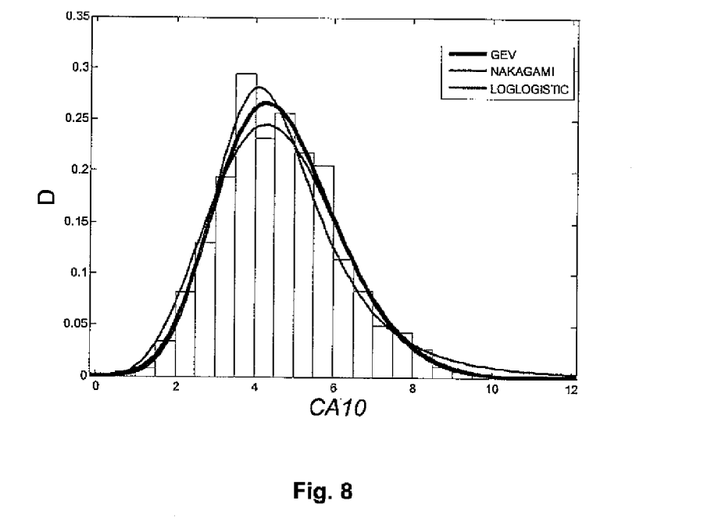
FIG. 8 illustrates modelling of the CA10 values by means of a non-normal law.

The method then comprises the following stages:
1—removing X CA10 values from the N values of the distribution to be modelled. The lowest values are preferably removed;
2—modelling the distribution of the remaining CA10 values by selecting an a priori law (gamma law, Generalized Extreme Values, Weibull, Nakagami, log-logistic, . . . ) as illustrated in FIG. 8;
3—calculating a modelling quality criterion;
4—if the criterion indicates an insufficient quality, further removing other CA10 values from the N-X CA10 values. The remaining lowest values are preferably removed. The process is then reiterated.

Removing the X cycles for which the CA10 values are the lowest amounts for discarding thereof from the sample values that potentially correspond to pre-ignitions. After some iterations, the algorithm allows elimination of all the pre-ignitions and thus leads to a sample including only combustions normally initiated by the spark plug. The detection threshold between the pre-ignitions and the normal combustions is thus automatically set by this algorithm when the modelling criterion indicates an optimum modelling.

Among these criteria to be minimized, the invention uses for example the sum of the rms deviations between the experimental distribution ($x_{i\_exp}$) and the modelled distribution ($x_{i\_modélisés}$):

$$I_2 = \Sigma(x_{i\_exp} - x_{i\_modélisés})^2$$

or the sum of the absolute deviations between the two distributions:

$$I_3 = \Sigma |x_{i\_exp} - x_{i\_modélisés}|.$$

Figure 9:
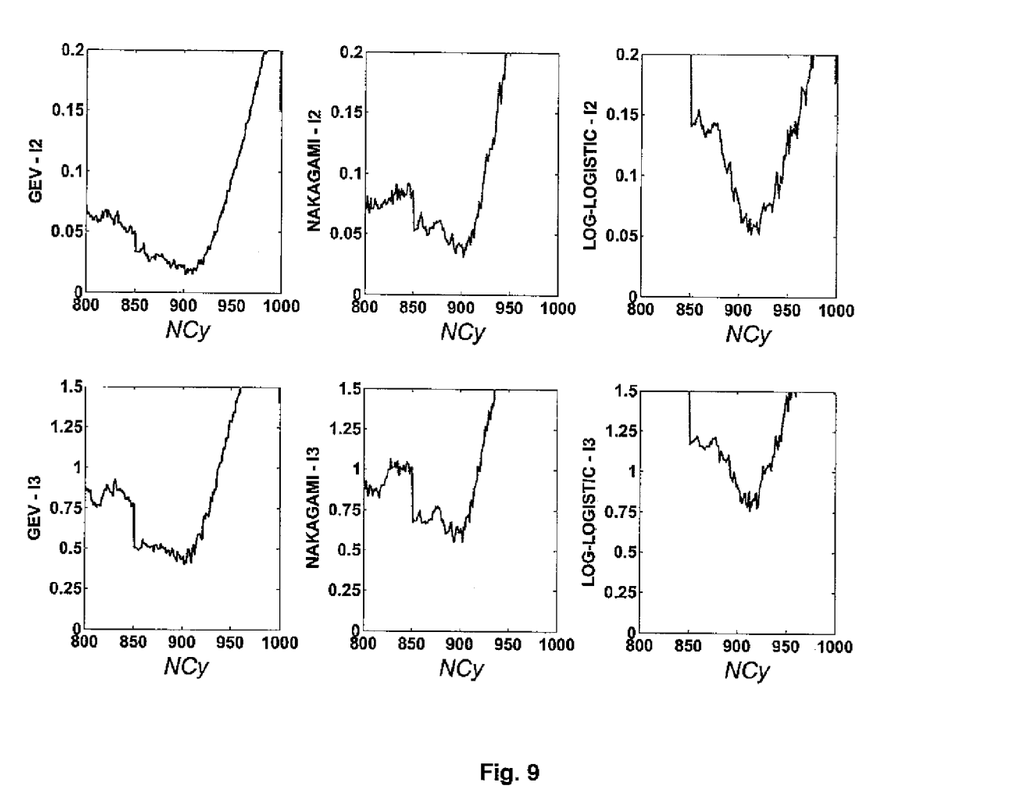
FIG. 9 shows the evolutions of criteria I2 and I3 as a function of the number of cycles (Ncy) used for modelling according to three laws: GEV, NAKAGAMI and LOG-LOGISTIC.

This method is illustrated in FIG. 9 showing the evolutions of criteria $I_2$ and $I_3$ as a function of the number of cycles (Ncy) used for modelling according to three laws (GEV, NAKAGAMI and LOG-LOGISTIC). These criteria first decrease because the modelling gains in reliability when discarding the pre-ignitions. These criteria then increase progressively since normal cycles are also removed in addition to the pre-ignitions, and the modelling loses in quality. The pre-ignition detection threshold thus quantifies the number of cycles to be removed from the complete sample in order to reach optimum modelling.

It can be seen in this example that these criteria reach minima when 80 to 100 cycles are removed from the sample, which corresponds to the number of pre-ignitions that an iterative sorting procedure allows to be detected.

Then, from the CA10 values distribution law thus modelled, one or more parameters characteristic of this distribution are calculated. The following parameters can for example be used: mean, median, asymmetry factor, or flattening factor.

3—Definition of Thresholds and Detection of Combustion with Pre-Ignition

Thresholds are defined from these parameters characteristic of the distribution of a normal combustion. These thresholds allow defining whether a given CA10 value belongs or not to the distribution of the CA10 values of the N preceding cycles, without accounting for the combustions with pre-ignition.

There are many known techniques for determining if a value belongs to a given distribution. Examples thereof are the X2 test, the Kolmogorov test, and the maximum likelihood test.

It is also possible to use only the robust mean m(N) and standard deviation σ(N). For example, it can be considered that, if a CA10 value is greater than twice the standard deviation, then this value corresponds to a combustion with pre-ignition.

Thus, the calculated thresholds are dynamic because they evolve at each cycle. In fact, for each cycle, the distribution of the CA10 values of the N previous cycles is characterized while ignoring the extreme values. The parameters used to characterize this distribution are then used to define a threshold. In the next cycle, the distribution is again characterized and the threshold is therefore modified.

In fact, a threshold is defined from the parameters characterizing a distribution of CA10 values obtained during combustions without pre-ignition and from a tolerance on these parameters: robust mean and tolerance related to the standard deviation for example.

Once the thresholds are defined, CA10 is calculated for the cycle in progress and it is compared with the defined threshold to detect the start of an abnormal combustion by comparing the combustion indicator (CA10) and the threshold.

Other Embodiments

According to a particular embodiment, the definition of the parameters characteristic of the distribution of a normal combustion can be constrained from known values obtained on the test bench and/or the values obtained in previous cycles.

Using the threshold values obtained in previous cycles allows to better monitor the engine dynamics and to smooth it.

Using values obtained on the bench allows integration of the calibration constraints so that the dynamic thresholds are "bounded".

In practice, a threshold $t_D(N)$ is calculated by applying the following stages:
1. Determining on the engine test bench a threshold $t_C$ related to calibration constraints and/or recording $N_D$ dynamic thresholds calculated for cycles preceding the cycle in progress: $t_D(N-1)$, $t_D(N-2)$; and 2. Calculating a parameter characteristic of the distribution of the N values of CA10 calculated in the N−1 previous cycles and the cycle in progress, while ignoring the values referred to as "extreme";

A robust estimator m(N) minimizing a function f, defined from the values V(i) of CA10, m, $t_C$ and $t_D$, is calculated. It is possible to use for example:

$$|(V(1)-m)|\hat{0}1+\ldots+|(V(N)-m)|\hat{0}1+(m-(m(N-1)+m(N-2))/2).$$

In this example, estimator m(N) is akin to a median, but constrained to remain close to the mean of the last two "means", denoted by m(N−1) and m(N−2).

3. Defining a Threshold:

A threshold $t_D(N)$ is calculated from a function g depending on V, m, $t_C$ and $t_D$, and parameters kj determined in advance. It is possible to use for example:

$$t_D(N)=\min [m(N)-m(N-1)+t_D(N-1), t_C].$$

Thus, for example, if m(N) has varied from one cycle to the next, the threshold is increased in proportion (term m(N)−m(N−1)+$t_D$(N−1), without however exceeding threshold $t_C$ set upon calibration.

4—Abnormal Combustion Control

By means of this comparison, the engine calculator can detect the start of an abnormal combustion of rumble or pre-ignition type in the combustion chamber.

In the case of abnormal combustion, this calculator then launches the actions required for control of this combustion in order to avoid the continuation of such a combustion.

What is referred to as abnormal combustion control is the possibility of controlling the progress of this combustion in order to avoid sudden destructive pressure increases, as well as the possibility of completely stopping such a combustion, through smothering for example.

This combustion control is preferably carried out by fuel re-injection at a crank angle determined by injection nozzles 18. More precisely, the calculator controls valves 20 in such a way that the injection nozzle of the cylinder concerned allows an amount of fuel to be fed into the combustion chamber in liquid form. The amount of fuel re-injected depends on the composition of the engine and it can range between 10% and 200% of the amount of fuel initially fed into this combustion chamber. The re-injected fuel is therefore used to counter the flame that starts spreading in case of abnormal combustion. This re-injection allows to either blow out this flame or to smother it by increasing the fuel/air ratio of the fuel mixture. Furthermore, the fuel injected in liquid form uses the heat present around this flame to vaporize and the temperature conditions around the flame decrease, thus retarding combustion of the fuel mixture and notably its auto-ignition.

After this fuel injection, the pressure in the cylinder increases, but less suddenly. This pressure thereafter decreases and reaches a level compatible with the pressure level of a conventional combustion.

This mechanism prohibits any development of an abnormal combustion with a high combustion rate and high pressures. Of course, the means designed to control abnormal combustion are used in each cycle during which such a combustion is detected by the calculator.

The actions of the method as described above can be combined with other, slower actions, such as throttle closure, to prevent the pressure conditions in the combustion chamber from promoting an abnormal combustion in the next cycles.

The present invention is not limited to the examples described above and it encompasses any variant and equivalent.

Notably, without departing from the scope of the invention, other agents intended to stop an abnormal combustion can be fed into the combustion chamber. Thus, these agents can be water in vapour or liquid form, or carbon dioxide. In this case, the engine comprises specific additional nozzles for introduction of these agents in association with a dedicated circuit (pump, tank, . . . ).

It can also be possible to control the abnormal combustion by lowering the internal pressure of the combustion chamber by means of a pressure relief, by opening a pressure-relief valve. This valve can be either an additional valve or intake valve 24 and/or exhaust valve 30.

Furthermore, the present invention can also relate to an indirect-injection spark-ignition engine. In this case, the course of an abnormal combustion is controlled by means of a specific nozzle (fuel, water, $CO_2$), as mentioned above, or by valve opening.

The invention allows using other measurements than the cylinder pressure, such as the instantaneous torque, the instantaneous engine speed, the vibration level (accelerometric detectors), ionization signal. The invention could also use other indicators:

from the cylinder pressure: MIP, maximum cylinder pressure, crank angle at maximum pressure, and CAxx, maximum energy release from the instantaneous torque: maximum torque, maximum torque derivative;

from the instantaneous engine speed: maximum speed, maximum acceleration.

The indicators derived from the cylinder pressure or from an ionization signal are preferably used. In fact, good pre-ignition characterization first of all requires defining indicators that are as representative as possible of the combustion progress in the chamber. An indicator such as CA10 is therefore for example more robust than an indicator derived from an instantaneous torque measurement because of the "distance" of this measurement (the torque recovered at the crankshaft is an image of the energy recovered after combustion, and not directly an image of the combustion progress). Monitoring the engine from these torque and engine speed measurements can however be considered.

The huge advantage of the CA10 angle and of the initiation delay is that they directly account for the first moments of combustion. Detection of an abnormal behavior during these first moments consequently allows having more time for action during the same cycle.

The invention is not limited to the use of a single indicator. In fact, it can be advantageous to combine several quantities using a multi-criteria threshold or a threshold for each indicator.

Finally, the method according to the invention can also be applied on the engine test bench.

The invention claimed is:

1. A method for controlling combustion of a spark-ignition internal-combustion engine, wherein an abnormal combustion is detected in a combustion chamber of at least one cylinder of the engine, a signal representative of a state of the combustion is recorded by a detector disposed in the engine and at least one indicator of the combustion at each engine cycle is determined from the signal for each engine cycle comprising:

determining at least one parameter characterizing a distribution of a number of combustion indicator values acquired over the number of engine cycles preceding an engine cycle in progress either with an estimator or a method of modeling the distribution, by ignoring, at least some of the indicator values which are obtained during pre-ignition;

defining at least one threshold for the at least one indicator by parameters characterizing the distribution;

detecting a start of an abnormal combustion by comparing the at least one indicator of the combustion with the threshold; and controlling, in response to detecting the start of abnormal combustion, a course of the detected abnormal combustion in the at least one combustion chamber.

2. A method as claimed in claim 1, wherein the signal is a continuous pressure measurement within the cylinder.

3. A method as claimed in claim 2, wherein the at least one indicator is the crank angle at which part of the energy introduced has been released.

4. A method as claimed in claim 3, wherein the estimator is selected from a trimmed mean, a median and an estimator m resulting from a minimization of the following function f:

$$f(V,m)=(|V(1)-m|)a+\ldots+(|V(N)-m|)a,$$

wherein a is a real number ranging between 0 and 2, and V(1) ... V(n) are the N combustion indicator values.

5. A method as claimed in claim 3, wherein the method of modelling the distribution comprises:
   a) removing indicator values from the number of values of a distribution to be modeled;
   b) modelling the distribution of remaining indicator values by selecting an a priori experimental distribution law;
   c) calculating a modelling quality criterion; and
   d) if the criterion indicates an insufficient modelling quality, removing other indicator values from remaining indicator values defined by a difference of the number of indicator values and a number of removed indicator values and repeating b).

6. A method as claimed in claim 5, wherein a criterion, used for modeling the distribution is a sum of rms deviations between the a priori experimental distribution and the modelled distribution, or to a sum of absolute deviations between the a priori experimental distribution and the modelled distribution.

7. A method as claimed in claim 3, wherein the at least one threshold is determined by constraints defined from the at least one threshold value obtained from testing and/or from threshold values obtained in previous engine cycles.

8. A method as claimed in claim 3, wherein combustion indicators are determined and the at least one threshold is also determined for each combustion indicator.

9. A method as claimed in claim 2, wherein the estimator is selected from a trimmed mean, a median and an estimator m resulting from a minimization of the following function f:

$$f(V,m)=(|V(1)-m|)a+\ldots+(|V(N)-m|)a,$$

wherein a is a real number ranging between 0 and 2, and V(1) ... V(n) are the N combustion indicator values.

10. A method as claimed in claim 2, wherein the method of modelling the distribution comprises:
   a) removing indicator values from the number of values of a distribution to be modeled;
   b) modelling the distribution of remaining indicator values by selecting an a priori experimental distribution law;
   c) calculating a modelling quality criterion; and
   d) if the criterion indicates an insufficient modelling quality, removing other indicator values from remaining indicator values defined by a difference of the number of indicator values and a number of removed indicator values and repeating b).

11. A method as claimed in claim 10, wherein a criterion, used for modeling the distribution is a sum of rms deviations between the a priori experimental distribution and the modelled distribution, or to a sum of absolute deviations between the a priori experimental distribution and the modelled distribution.

12. A method as claimed in claim 2, wherein the at least one threshold is determined by constraints defined from the at least one threshold value obtained from testing and/or from threshold values obtained in previous engine cycles.

13. A method as claimed in claim 2, wherein combustion indicators are determined and the at least one threshold is also determined for each combustion indicator.

14. A method in accordance with claim 2 wherein the part of the energy is 10%.

15. A method as claimed in claim 1, wherein the at least one indicator is the crank angle at which part of the energy introduced has been released.

16. A method as claimed in claim 15, wherein the estimator is selected from a trimmed mean, a median and an estimator m resulting from a minimization of the following function f:

$$f(V,m)=(|V(1)-m|)a+\ldots+(|V(N)-m|)a,$$

wherein a is a real number ranging between 0 and 2, and V(1) ... V(n) are the N combustion indicator values.

17. A method as claimed in claim 15, wherein the method of modelling the distribution comprises:
   a) removing indicator values from the number of values of a distribution to be modeled;
   b) modelling the distribution of remaining indicator values by selecting an a priori experimental distribution law;
   c) calculating a modelling quality criterion; and
   d) if the criterion indicates an insufficient modelling quality, removing other indicator values from remaining indicator values defined by a difference of the number of indicator values and a number of removed indicator values and repeating b).

18. A method as claimed in claim 17, wherein a criterion, used for modeling the distribution is a sum of rms deviations between the a priori experimental distribution and the modelled distribution, or to a sum of absolute deviations between the a priori experimental distribution and the modelled distribution.

19. A method in accordance with claim 15 wherein the part of the energy is 10%.

20. A method as claimed in claim 15, wherein the at least one threshold is determined by constraints defined from the at least one threshold value obtained from testing and/or from threshold values obtained in previous engine cycles.

21. A method as claimed in claim 15, wherein combustion indicators are determined and the at least one threshold is also determined for each combustion indicator.

22. A method in accordance with claim 15 wherein the part of the energy is 10%.

23. A method in accordance with claim 15 wherein the part of the energy is 10%.

24. A method as claimed in claim 1, wherein the estimator is selected from a trimmed mean, a median and an estimator m resulting from a minimization of the following function f:

$$f(V,m)=(|V(1)-m|)a+\ldots+(|V(N)-m|)a,$$

wherein a is a real number ranging between 0 and 2, and V(1) ... V(n) are the N combustion indicator values.

25. A method as claimed in claim 1, wherein the method of modelling the distribution comprises:
   a) removing indicator values from the number of values of a distribution to be modeled;

b) modelling the distribution of remaining indicator values by selecting an a priori experimental distribution law;
c) calculating a modelling quality criterion; and
d) if the criterion indicates an insufficient modelling quality, removing other indicator values from remaining indicator values defined by a difference of the number of indicator values and a number of removed indicator values and repeating b).

26. A method as claimed in claim 25, wherein a criterion, used for modeling the distribution is a sum of rms deviations between the a priori experimental distribution and the modelled distribution, or to a sum of absolute deviations between the a priori experimental distribution and the modelled distribution.

27. A method as claimed in claim 1, wherein the at least one threshold is determined by defining a tolerance for the parameter characterizing the distribution.

28. A method as claimed in claim 1, wherein the at least one threshold corresponds to a sum of a trimmed mean of the number of indicator values and of k times a standard deviation of the number of values, wherein the real number is a positive or negative real number.

29. A method as claimed in claim 1, wherein the at least one threshold is determined by constraints defined from the at least one threshold value obtained from testing and/or from threshold values obtained in previous engine cycles.

30. A method as claimed in claim 1, wherein combustion indicators are determined and the at least one threshold is also determined for each combustion indicator.

* * * * *